US008059615B1

(12) United States Patent
Narendran et al.

(10) Patent No.: US 8,059,615 B1
(45) Date of Patent: Nov. 15, 2011

(54) SELECTIVE PERSONALITY NEGOTIATION DURING SESSION NEGOTIATION

(75) Inventors: Rajveen Narendran, Overland Park, KS (US); Andrew M. Wurtenberger, Olathe, KS (US); Sreekar Marupaduga, Overland Park, KS (US); Bret D. Vondemkamp, Shawnee, KS (US); Kristin A. Hayne, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 604 days.

(21) Appl. No.: 12/206,487

(22) Filed: Sep. 8, 2008

(51) Int. Cl.
H04B 7/216 (2006.01)
(52) U.S. Cl. ........................................ 370/335; 370/331
(58) Field of Classification Search .................. 370/335, 370/331, 342, 229, 395.2, 395.21
See application file for complete search history.

(56) References Cited

U.S. PATENT DOCUMENTS

| 7,065,089 | B2 | 6/2006 | Kuhl et al. | |
|---|---|---|---|---|
| 7,161,942 | B2 | 1/2007 | Chen et al. | |
| 7,602,723 | B2 | 10/2009 | Mandato et al. | |
| 7,653,735 | B2 | 1/2010 | Mandato et al. | |
| 2004/0156388 | A1 | 8/2004 | Bush | |
| 2006/0039313 | A1 | 2/2006 | Chou | |
| 2006/0153079 | A1* | 7/2006 | Yoon et al. | 370/235 |
| 2007/0115816 | A1 | 5/2007 | Sinivaara | |
| 2007/0201366 | A1 | 8/2007 | Liu | |
| 2008/0013488 | A1* | 1/2008 | Garg et al. | 370/331 |
| 2008/0089228 | A1 | 4/2008 | Lin et al. | |
| 2008/0117859 | A1* | 5/2008 | Shahidi et al. | 370/328 |
| 2009/0209223 | A1* | 8/2009 | Kone et al. | 455/343.1 |
| 2010/0040018 | A1* | 2/2010 | Appani et al. | 370/331 |

OTHER PUBLICATIONS

Non-Final Office Action from U.S. Appl. No. 11/954,827 mailed Oct. 26, 2010.
Unpublished U.S. Appl. No. 11/954,827, entitled "Predictive Personality Negotiation During Session Negotiation," filed Dec. 12, 2007 in the name of Narendran et al.
Final Office Action from U.S. Appl. No. 11/954,827 mailed Apr. 19, 2011.

* cited by examiner

*Primary Examiner* — Brian Nguyen

(57) ABSTRACT

Methods are provided for implementing selective personality negotiation during session negotiation. In one embodiment, an access node maintains an access-node-supported set of one or more personalities supported by the access node, wherein the access-node-supported set comprises a personality 0. The access node receives from an access terminal an access-terminal-supported set of one or more personalities supported by the access terminal, wherein the access-terminal-supported set also comprises the personality 0. Responsive to receiving the access-terminal-supported set, the access node negotiates a session-specific set of one or more personalities with the access terminal for use by the access terminal during a session, the session-specific set consisting of personality 0 and a first personality, wherein the first personality is a highest-numbered personality in the intersection of the access-node-supported set and the access-terminal-supported set.

11 Claims, 4 Drawing Sheets

SELECTIVE PERSONALITY NEGOTIATION DURING SESSION NEGOTIATION

BACKGROUND

1. Technical Field

The present invention relates to wireless communications, and, more particularly, to configuration of access nodes and access terminals in wireless communication systems.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a CDMA protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN for the access terminal. The access node also facilitates establishment of a data link (e.g., a point-to-point protocol (PPP) connection) between the access terminal and the PDSN. Furthermore, an entity such as the PDSN or a Mobile-IP home agent assigns an IP address to the access terminal.

Once session negotiation (described further below) is complete, the access terminal has a session with the access node, and can therefore communicate over the packet-data network via the access node and the PDSN. Typically, the air-interface connection is then torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it sends another connection request to the access node, which then assigns a traffic channel to the access terminal. If, however, the access node receives data addressed to the access terminal, the access node typically sends a page to the access terminal over a paging channel, and assigns a traffic channel to the access terminal. The access terminal can then communicate over the packet-data network, using the traffic channel, IP address, radio-packet connection, and data link.

SUMMARY

Methods are provided for implementing selective personality negotiation during session negotiation. In one aspect, an embodiment may take the form of a method according to which an access node maintains an access-node-supported set of one or more personalities supported by the access node, wherein the access-node-supported set comprises a personality 0. The access node receives from an access terminal an access-terminal-supported set of one or more personalities supported by the access terminal, wherein the access-terminal-supported set also comprises personality 0. Responsive to receiving the access-terminal-supported set, the access node negotiates a session-specific set of one or more personalities with the access terminal for use by the access terminal during a session, the session-specific set consisting of personality 0 and a first personality, wherein the first personality is a highest-numbered personality in the intersection of the access-node-supported set and the access-terminal-supported set.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
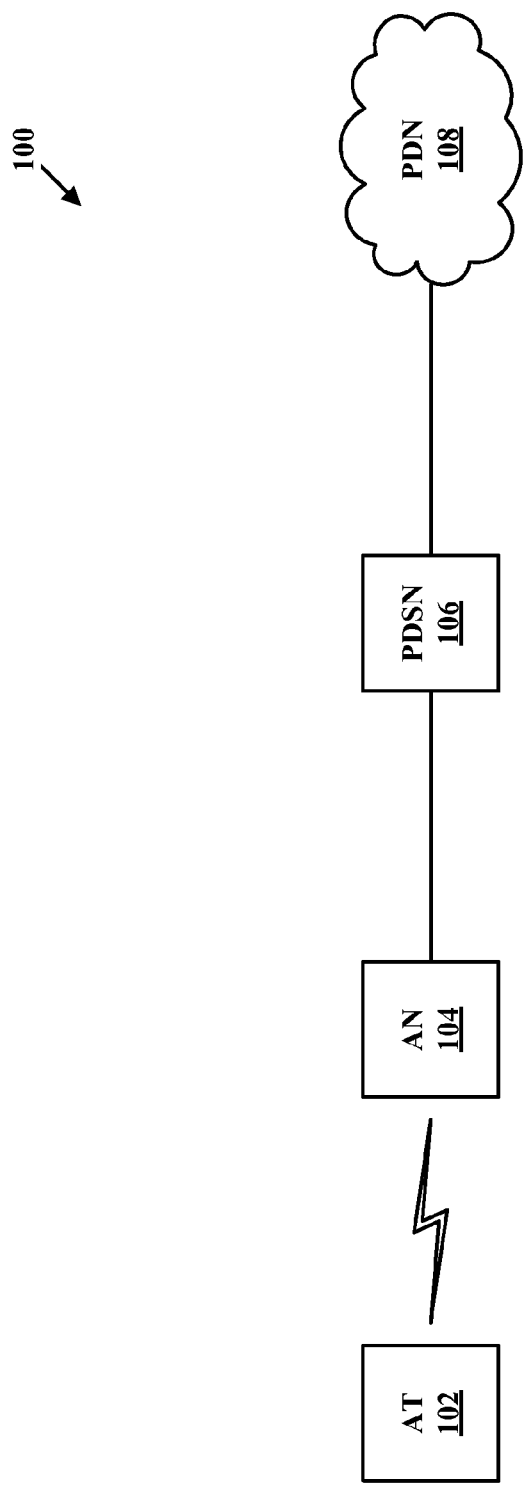
FIG. 1 is a simplified block diagram of a communication system, in accordance with exemplary embodiments.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows (or more generically push-to-x (PTX) (i.e. push to anything (audio, video, and/or IM, etc.)) packet flows), streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as IS-856, Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, which is another way of stating that it can engage in more than one type of packet flow. IS-856, Revision A and IS-856, Release 0 are hereby incorporated herein by reference.

Furthermore, to be able to participate in one or more of these various types of packet flows, an access terminal may run (i.e., launch, enable, execute, etc.) particular communication applications, perhaps in response to receiving one or more user commands. As an example, to be able to participate in push-to-talk (PTT) packet flows, the access terminal may enable a PTT application. As another example, to be able to participate in IM packet flows, an access terminal may run an IM application. As yet another example, to be able to engage in web-browsing packet flows, an access terminal may launch a web browser. And so on.

During (and typically near the end of) session negotiation, the access terminal and the access node negotiate a set of profile IDs for the access terminal to use during the session; in other words, they agree as to the types of packet flows in which the access terminal is capable of engaging and in which the access terminal is permitted to engage during the session. Typically prior to this profile-ID negotiation, the access node and the access terminal negotiate a set of what are known as "personalities" for the access terminal. This negotiated set of personalities then defines, in some ways more broadly than profile-ID negotiation, the types of EV-DO communication in which the access terminal will be eligible to engage during the session.

During a typical personality negotiation, an access terminal and an access node may negotiate approximately five personalities, which may take on the order of four or five seconds. These personalities relate to which release/revision of IS-856 is supported, as well as more specific functionality, and are often correlated with different types of packet flows having differing qualities of service (QoS). For example, a "personality 0" may relate to IS-856, Rel. 0, and be associated with Rel. 0 best-effort data transfer. Furthermore, a "personality 1" may also relate to IS-856, Rel. 0, but also include functionality pertaining to dynamically-updateable reverse-link transitional parameters, which relate to the parameters (e.g. probabilities) associated with access terminals stepping up or stepping down their reverse-link data-transfer rates.

Furthermore, a "personality 2" may pertain to IS-856, Rev. A, and be associated with Rev. A best-efforts data transfer. A "personality 3" may also pertain to Rev. A, with the added functionality of providing QoS (for multi-packet-flow communication). Finally, a "personality 4" may also pertain to Rev. A, with the functionality of personality 3 as well as with additional functionality such as robust overhead header compression, as well as increased efficiencies for handoffs (i.e. for providing enhanced multi-packet-flow communication). And other possibilities exist as well, including providing a different number and/or one or more different types of personalities, as these five personalities are provided by way of illustration and not limitation.

Once personality negotiation is complete, the access node and the access terminal then conduct the above-mentioned profile-ID negotiation, to agree on a set of profile IDs that the access terminal may use during the ensuing session. During the session, when the access terminal is communicating via the access node according to the agreed-upon set of profile IDs, and in particular as part of setting up a packet flow, either the access terminal or the access node, or both, may send the other a message known as a ReservationOnRequest (RoR). The RoR includes at least one profile ID, indicating the type of packet flow that is being requested.

Once an RoR has been sent and acknowledged, the access terminal has an "open reservation" on the assigned traffic channel. This open reservation is associated with the profile ID that was included in the RoR; in other words, the open reservation is associated with the type of packet flow in which the access terminal is then able to engage. Note that an access terminal may have more than one open reservation on the traffic channel at one time, corresponding to the fact that the access terminal can engage in more than one packet flow at one time.

Each packet flow in which the access terminal engages during the session is also associated with a personality. As examples, a web-browsing packet flow may be an instance of the access terminal communicating according to personality 0 (Rel. 0, best-efforts), while a video-telephony packet flow may be an instance of the access terminal communicating according to personality 3 (Rev. A with QoS); and so on. The access node and the network in general may then use the personality and/or profile-ID information associated with a packet flow to apply (or not apply) a particular QoS to the packet flow, which essentially means providing a particular level of packet-forwarding (or "expedited-forwarding") treatment to certain packet flows. This traffic shaping is also known as "DiffServ" ("differentiated services").

With respect to personality negotiation, in a typical implementation according to IS-856, Rev. A, RNC vendors may determine for themselves how many and what set of personalities will be negotiated during session negotiation with access terminals. So some vendors' RNCs may be arranged to negotiate all five of these personalities with each access terminal; some vendors' RNCs may be arranged to negotiate a particular subset of three of the five; another vendor's RNCs may be arranged to negotiate a different subset of three, and so on.

Furthermore, even if the substance of the personalities is the same across RNC vendors, the numbering of the personalities may be different. Thus, there is inconsistency across vendors, which can preclude inter-vendor handoffs, since sessions often cannot be transferred from a source RNC to a target RNC unless the session parameters (i.e. credentials) (including personality information) always negotiated by the source RNC closely (perhaps exactly) match those always negotiated by the target RNC. There is also negotiation of personalities that are never used, such as a laptop card (i.e. an "air card") that will do only best-efforts data transfers negotiating personalities 3 and 4 described above. And there are other problems; for example, in many instances, regardless of how many personalities are negotiated between the access node and an access terminal, the access terminal will only always communicate according to the highest-numbered negotiated personality (e.g. would use personality 4 even for best-efforts data).

As such, in accordance the present invention, rather than an access node conducting a standard personality negotiation of the same set of personalities with every access terminal every time, resulting in a situation where many personalities are negotiated never to be used, and further resulting in a situation where different access nodes negotiate different respective sets of personalities with access terminals as a matter of their normal course, resulting in inconsistency in session credentials across access nodes (e.g. across RNC vendors), an access node will instead, in some embodiments, negotiate with each access terminal only (1) personality 0 and (2) the highest-numbered personality supported by both the access node and that access terminal. As explained below, the inclusion of negotiation of personality 0 aids in handoff across RNCs.

Note that use of the modifier "highest-numbered" assumes a numbering convention that starts with a lowest number corresponding to the most "basic" personality (0), and proceeds to a highest number corresponding to the most "capable" or "complex" personality (e.g. the above-described personality 4). If another numbering or naming convention is used, the approach described herein would still apply after ordering the personalities from those treated with no QoS (or with the least amount of QoS) to those treated with the highest QoS, where each personality includes the functionality of those preceding it in the order, plus some additional functionality.

In one embodiment, during session negotiation, an access terminal may report to the access node a set of one or more personalities supported by the access terminal. This report may take the form of an attribute in a message, and in particular may take the form of an attribute known as the 'ATSupportedApplicationSubtype Attribute' in a message known as the 'Configuration Request' message. The access node may then compare this reported set of one or more personalities with a set of one or more personalities supported by the access node.

In one example, an access terminal may report that it supports all five personalities {0, 1, 2, 3, 4}, while an access node may support only {0, 2, 3}. In this case, the access node and the access terminal will only negotiate personalities {0, 3}. As a second example, with an access terminal that supports {0, 1}, the access node will negotiate only personality {0}. As a third example, with an access terminal that supports {0, 1, 2}, the access node will negotiate only personalities {0, 2}. And many other examples are of course possible as well.

Among the reasons that personality 0 was included in all of the previous examples, and in the previous embodiment generally is that, it is often the case that, when an access terminal (that, e.g., supports {0, 1, 2, 3, 4}) hands off from a source RNC that, e.g., supports {0, 1, 2, 3, 4}, to a target RNC that, e.g., supports {0, 1, 2}, the access terminal may be arranged to switch from communicating according to personality 4 to communicating according to personality 0 until such time as the access terminal goes into a dormant state, after which the access terminal may then conduct a personality negotiation (negotiating {0, 2} in this case) with the target RNC via a control channel, and thereafter communicate according to personality 2.

Note that, in some embodiments, the access node will negotiate with each respective access terminal only the highest-numbered personality supported by both the access node and the access terminal. Thus, reviving the above examples according to this alternate strategy, where the access node again supports personalities {0, 2, 3}: (i) with an access terminal that reports supporting all five personalities {0, 1, 2, 3, 4}, the access node will negotiate only personality {3}; (ii) with an access terminal that supports {0, 1}, the access node will again negotiate only personality {0}; (iii) with an access terminal that supports {0, 1, 2}, the access node will negotiate only personality {2}. And many other examples are of course possible as well.

In contrast with current approaches, according to which all personalities supported by both the access node and the access terminal are negotiated, the present approach should, on average, result in less excessive personality negotiation, decreased average session-negotiation time, and greater likelihood of successful inter-vendor handoffs (since each access terminal's session data has been simplified, decreasing the potential for inconsistencies). Preferably, all RNCs/access nodes would use the personality-numbering convention detailed above, or at least a consistent convention, further facilitating handoffs. Furthermore, on average, fewer resources such as processing time, airlink time slots, and access-terminal battery power should be consumed. Furthermore, RNC vendors are provided with the ability to select which personalities will be negotiated, i.e. which are best for their network. And there are other benefits as well, as those listed herein are by way of illustration and not limitation.

Finally, it should be noted that the above overview is illustrative and not limiting. That is, additional and/or different features may be present in some embodiments of the present invention. It should be noted as well that any description of an access node or other network element providing service or communicating according to EV-DO is by way of example; any suitable mode of wireless communication (e.g. protocol) may be used instead, such as 1×RTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal 102, an access node 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. Access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more access nodes over an air interface. As an example, the chipset could be suitable for engaging in EV-DO (Rel. 0 and/or Rev. A) communications. The chipset or wireless-communication interface in general may also be able to communicate with a 1×RTT CDMA network, a Wi-Fi network, and/or one or more additional types of wireless networks. The processor and data storage may be any suitable components known to those of skill in the art. As examples, access terminal 102 could be or include a cell phone, a PDA, a computer, a laptop, an air card, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals such as access terminal 102. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

PDSN 106 may be any networking server or other device arranged to carry out the PDSN functions described herein. As such, PDSN 106 may include a communication interface, a processor, and data storage comprising instructions executable by the processor for carrying out those PDSN functions. The communication interface may include a wired packet-data interface such as an Ethernet interface for communicating with access node 104 and over PDN 108. Note that, instead or in addition, PDSN 106 may comprise a wireless interface for communicating with access node 104 and over PDN 108. And PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation a. A First Exemplary Method

Figure 2:
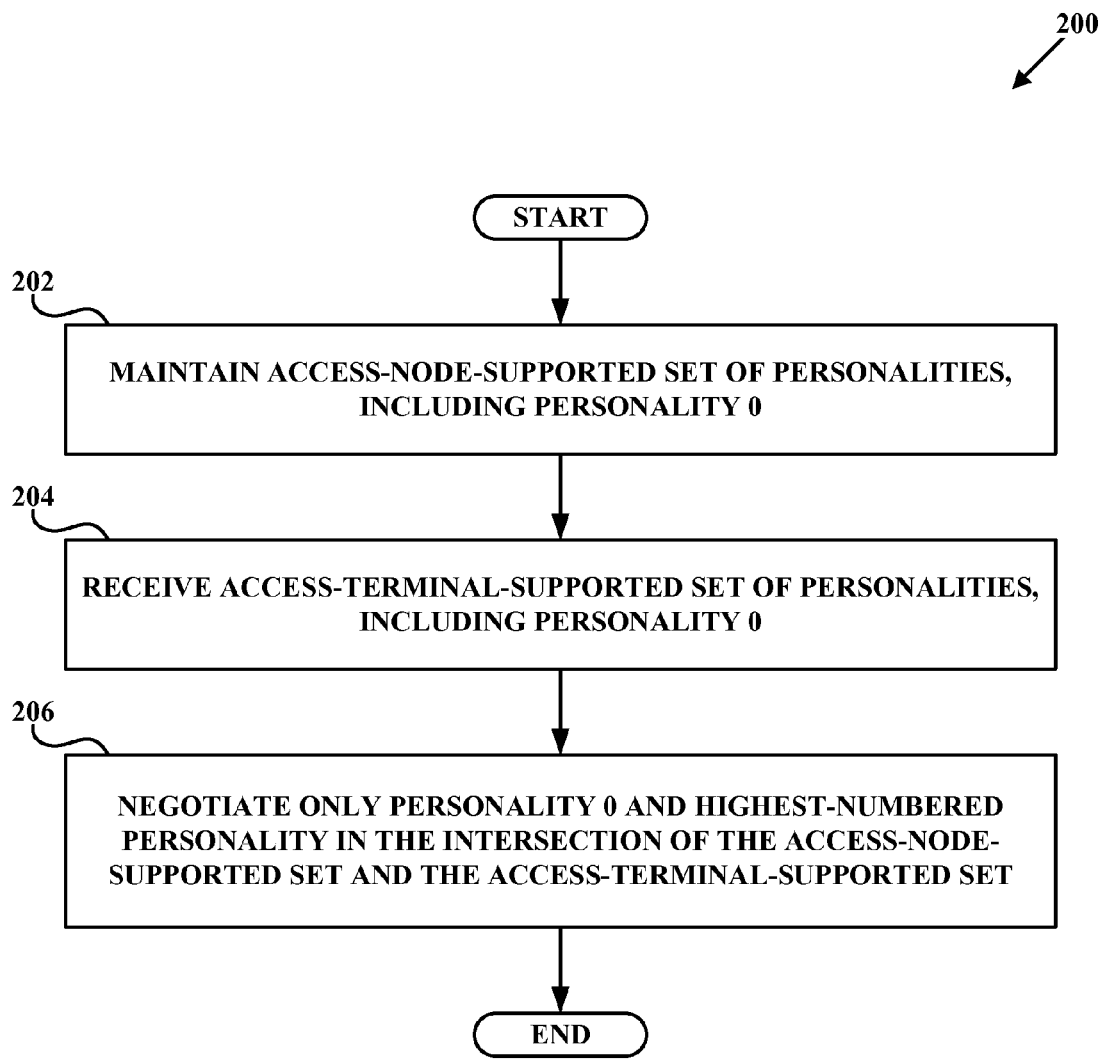
FIG. 2 is a flowchart of a method, in accordance with exemplary embodiments.

FIG. 2 depicts a flowchart of an exemplary method, in accordance with an exemplary embodiment. In some embodiments, method 200 may be carried out by an EV-DO access node, which may operate in compliance with (a) IS-856, Rev. A or (b) both IS-856, Rel. 0 and IS-856, Rev. A. The access node may include an RNC and at least one BTS. Method 200 is described herein as being carried out by access node 104, though the method could be carried out by any network entity or any combination of network entities.

As shown in FIG. 2, method 200 begins at step 202, when access node 104 maintains an access-node-supported set of one or more personalities that it supports, where this set includes a personality 0, which may be the personality 0 described above. At step 204, access node receives from access terminal 102 an access-terminal-supported set of one or more personalities supported by access terminal 102, where that set also includes personality 0. Step 204 may involve receiving a configuration request message that includes an attribute that conveys the access-terminal-supported set. Furthermore, at least one of the access-node-supported set and the access-terminal-supported set may include (a) at least one personality associated with IS-856, Rel. 0 and (b) at least one personality associated with IS-856, Rev. A. In an embodiment, the access-node-supported set and the access-terminal-supported set are both subsets of a comprehensive set of five personalities, such as the personalities {0, 1, 2, 3, 4} described above.

At step 206, responsive to receiving the access-terminal-supported set, access node 104 negotiates a session-specific set of one or more personalities with access terminal 102 for use by access terminal 102 during a session. The session-specific set consists of personality 0 and the highest-numbered personality in the intersection of the access-node-supported set and the access-terminal-supported set. Note that the intersection of two sets is the set of elements that are elements of both sets. As stated above, personality 0 may be associated with IS-856, Rel. 0 best-efforts data communication. The highest-numbered personality may be associated with IS-856, Rev. A data communication, such as personalities 2, 3, and 4 described above.

Note that, in the case where the highest-numbered personality that is an element of both the access-node-supported set and the access-terminal-supported set may be personality 0, in which case the session-specific set would consist only of personality 0. In other cases, that highest-numbered personality in common may be a personality other than personality 0, in which case the session-specific set would consist of both personality 0 and that other personality.

Access terminal 102 may then conduct a packet flow according to the highest-numbered personality supported by both it and access node 104. During that packet flow, access terminal 102 may handoff to some other (target) access node, at which point access terminal 102 may responsively switch to conducting the packet flow according to personality 0. After termination of the packet flow, access terminal 102 may conduct a personality negotiation with the target access node, negotiating a session-specific set of personalities with the target access node, where this session-specific set consists of personality 0 and the highest-numbered personality supported by both access terminal 102 and the target access node, assuming those are two different personalities. (If they are not, the negotiation will pertain only to personality 0.)

Finally, it should be noted that it is preferable that access node 104 use a numbering convention for personalities that matches that used by vendors other than the vendor that makes and/or programs access node 104, to facilitate inter-vendor handoffs, as described above.

b. A Second Exemplary Method

Figure 3:
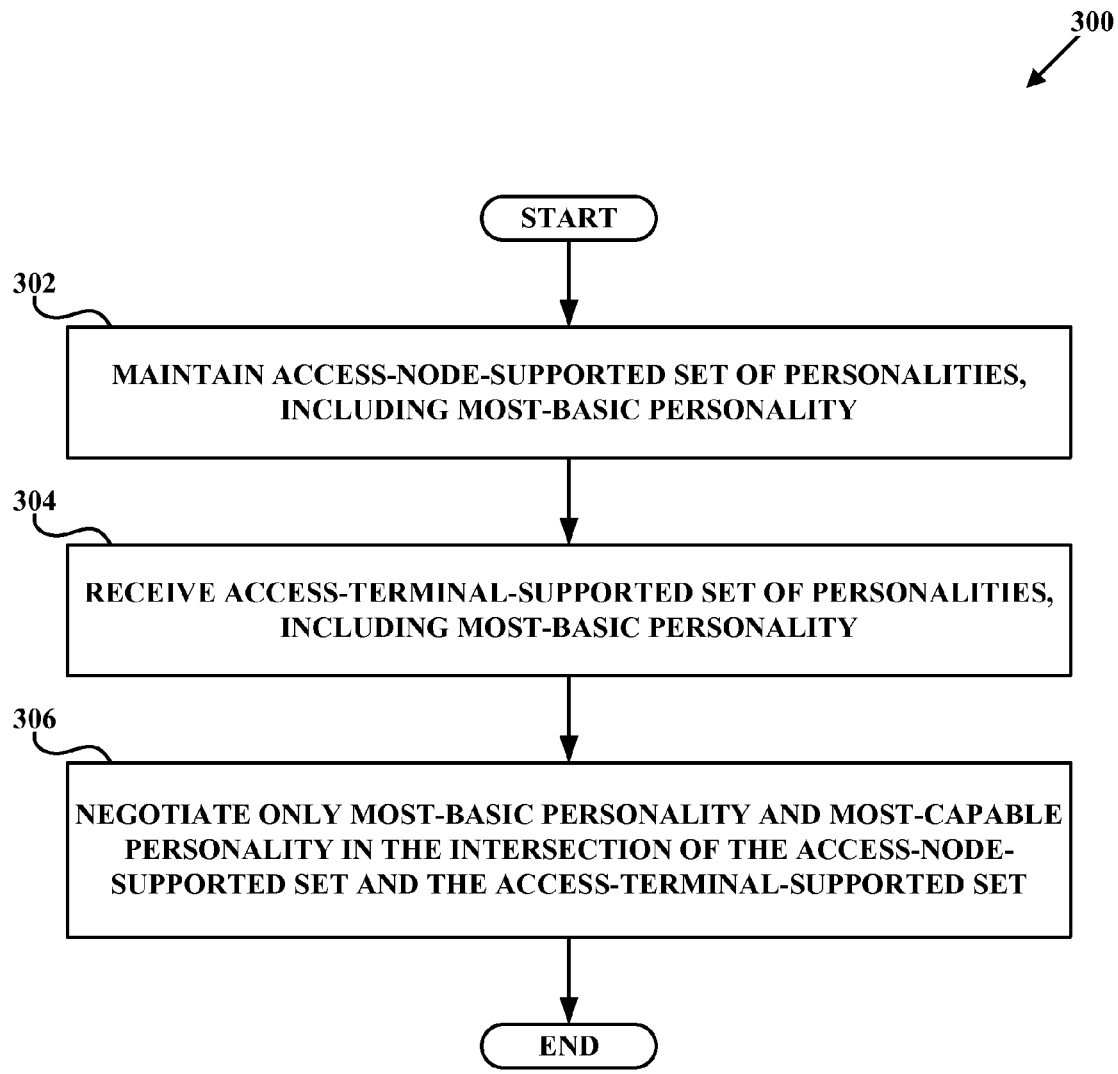
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by an access node such as access node 104, perhaps in cooperation with one or more other entities. Method 300 is similar to method 200, and thus is not described in as great of detail.

As shown in FIG. 3, method 300 begins at step 302, when access node 104 maintains an access-node-supported set of one or more personalities supported by access node 104, wherein the access-node-supported set is a subset of a comprehensive set of personalities, wherein the access-node-supported set includes a most-basic personality, which may be the one in the comprehensive set that receives the least (e.g. no) QoS and/or is associated with the least amount of functionality.

At step 304, access node 104 receives from access terminal 102 an access-terminal-supported set of one or more personalities supported by access terminal 102, wherein the access-terminal-supported set is a subset of the comprehensive set of personalities, wherein the access-terminal-supported set also includes the most-basic personality.

At step 306, responsive to receiving the access-terminal-supported set, access node 104 negotiates a session-specific set of one or more personalities with access terminal 102 for use by access terminal 102 during a session, the session-specific set consisting of the most-basic personality and the most-capable personality in the intersection of the access-node-supported set and the access-terminal-supported set. The most-capable personality may be the one in the comprehensive set that receives the highest QoS and/or is associated with the greatest amount of functionality, including perhaps all of the functionality of the most-basic personality, and perhaps all of the functionality of all of the other personalities is the comprehensive set.

c. A Third Exemplary Method

Figure 4:
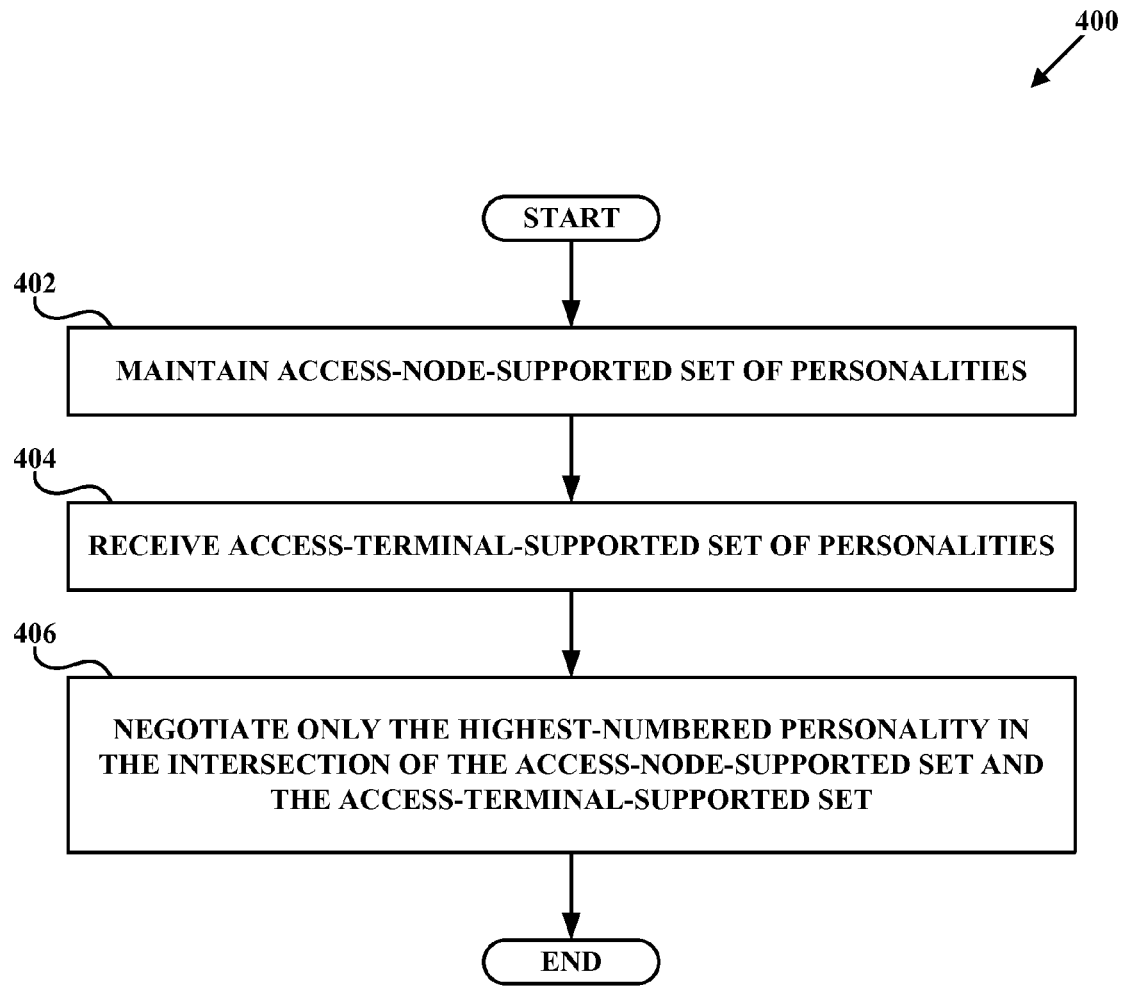
FIG. 4 is a flowchart of a method, in accordance with exemplary embodiments.

FIG. 4 is a flowchart of a third exemplary method, in accordance with an exemplary embodiment. In particular, FIG. 4 depicts a method 400, which may be carried out by an access node such as access node 104 (which may operate in compliance with (a) IS-856, Rev. A or (b) both IS-856, Rel. 0 and IS-856, Rev. A), perhaps in cooperation with one or more other entities. As with method 300, method 400 is not described in as great of detail as method 200.

As shown in FIG. 4, method 400 begins at step 402, when access node 104 maintains an access-node-supported set of one or more personalities that it supports. At step 404, access node 104 receives from access terminal 102 an access-terminal-supported set of one or more personalities supported by access terminal 102. As above, at least one of the access-node-supported set and the access-terminal-supported set may include (a) at least one personality associated with IS-856, Rel. 0 and (b) at least one personality associated with IS-856, Rev. A. The access-node-supported set and the access-terminal-supported set may be subsets of a comprehensive set of five personalities, consisting of (a) two personalities associated with IS-856, Rel. 0 and (b) three personalities associated with IS-856, Rev. A, such as the set of personalities {0, 1, 2, 3, 4} described above, as one example.

At step 406, responsive to receiving the access-terminal-supported set, access node 104 negotiates a session-specific set of one or more personalities with access terminal 102 for use by access terminal 102 during a session, the session-specific set consisting of only the highest-numbered personality in the intersection of the access-node-supported set and the access-terminal-supported set. As above, it is preferable that access node 104 use a numbering convention for personalities that matches that used by vendors other than the vendor that makes and/or programs access node 104, to facilitate inter-vendor handoffs.

4. Conclusion

Various exemplary embodiments have been described above. Those skilled in the art will understand, however, that changes and modifications may be made to those examples without departing from the scope of the claims.

The invention claimed is:
1. A method comprising:
maintaining a source-access-node-supported set of one or more personalities supported by a source access node, wherein the source-access-node-supported set comprises a personality 0;
receiving from an access terminal an access-terminal-supported set of one or more personalities supported by the access terminal, wherein the access-terminal-supported set comprises personality 0; and
responsive to receiving the access-terminal-supported set, negotiating a session-specific set of one or more personalities with the access terminal for use by the access terminal during a session, the session-specific set consisting of personality 0 and a first personality, wherein the first personality is not personality 0, and wherein the first personality is a highest-numbered personality in the intersection of the source-access-node-supported set and the access-terminal-supported set, the method further comprising:
the access terminal conducting a packet flow according to the first personality;
the access terminal handing off during the packet flow to a target access node, wherein handing off comprises switching to communicating according to personality 0; and after a termination of the packet flow, the access terminal conducting a personality negotiation with the target access node.

2. The method of claim 1, wherein the source access node comprises an Evolution Data Optimized (EV-DO) access node, wherein the access terminal comprises an EV-DO access terminal, wherein either or both of the source access node and the access terminal operate in compliance with (a) IS-856, Revision A or (b) both IS-856, Release 0 and IS-856, Revision A.

3. The method of claim 2, wherein the source access node comprises a radio network controller (RNC) and at least one base transceiver station (BTS).

4. The method of claim 1, wherein the access terminal comprises at least one of a cellular telephone, a personal digital assistant (PDA), a computer, a laptop computer, a laptop air card, and a hybrid access terminal.

5. The method of claim 1, wherein at least one of the source-access-node-supported set and the access-terminal-supported set comprises (a) at least one personality associated with IS-856, Release 0 and (b) at least one personality associated with IS-856, Revision A.

6. The method of claim 1, wherein the source-access-node-supported set and the access-terminal-supported set are subsets of a comprehensive set of personalities, the comprehensive set consisting of five personalities.

7. The method of claim 6, wherein the comprehensive set of personalities consists of (a) two personalities associated with IS-856, Release 0 and (b) three personalities associated with IS-856, Revision A.

8. The method of claim 1, wherein personality 0 is associated with IS-856, Release 0 best-efforts data communication.

9. The method of claim 1, wherein the first personality is associated with IS-856, Revision A data communication.

10. The method of claim 1, wherein receiving the access-terminal-supported set comprises receiving a configuration request message, the configuration request message comprising an attribute that conveys the access-terminal-supported set.

11. A method comprising:

maintaining a source-access-node-supported set of one or more personalities supported by a source access node, wherein the source-access-node-supported set comprises a most-basic personality;

receiving from an access terminal an access-terminal-supported set of one or more personalities supported by the access terminal, wherein the access-terminal-supported set comprises the most-basic personality; and responsive to receiving the access-terminal-supported set, negotiating a session-specific set of one or more personalities with the access terminal for use by the access terminal during a session, the session-specific set consisting of the most-basic personality and a first personality, wherein the first personality is not the most-basic personality, and wherein the first personality is a most-capable personality in the intersection of the source-access-node-supported set and the access-terminal-supported set, the method further comprising:

the access terminal conducting a packet flow according to the first personality;

the access terminal handing off during the packet flow to a target access node, wherein handing off comprises switching to communicating according to the most-basic personality; and after a termination of the packet flow, the access terminal conducting a personality negotiation with the target access node.

\* \* \* \* \*